ELECTRONIC STEP INTEGRATOR
Filed Nov. 17, 1964
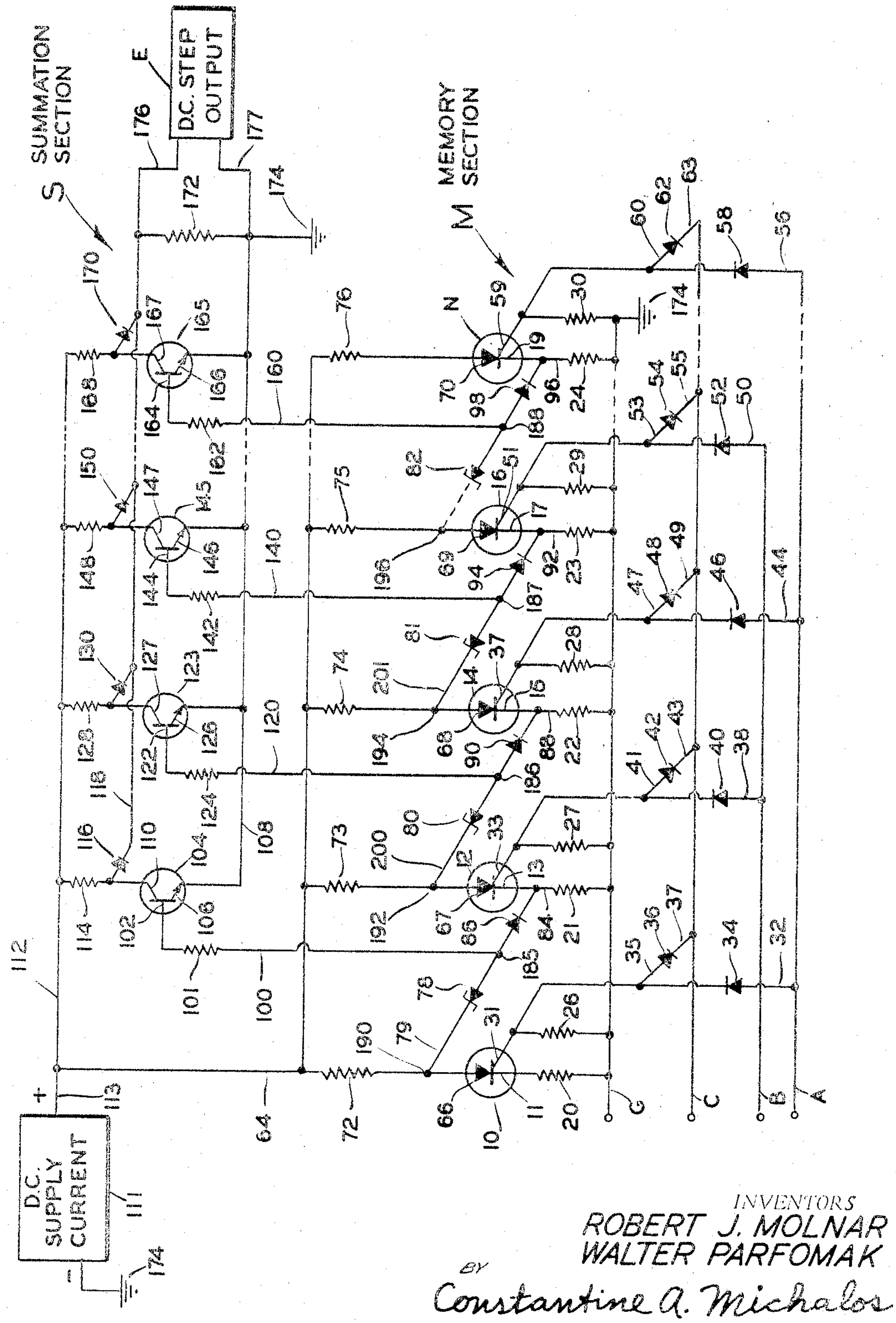
INVENTORS
ROBERT J. MOLNAR
WALTER PARFOMAK
BY
Constantine A. Michalos
ATTORNEY 3,427,609
Patented Feb. 11, 1969

3,427,609

ELECTRONIC STEP INTEGRATOR

Robert J. Molnar, New York, and Walter Parfomak, Brooklyn, N.Y., assignors to The Bendix Corporation, Teterboro, N.J., a corporation of Delaware Filed Nov. 17, 1964, Ser. No. 411,803
U.S. Cl. 340—347 11 Claims
Int. Cl. H04l *3/00;* H03k *13/02*

ABSTRACT OF THE DISCLOSURE

Means for providing a direct current step voltage output in response to alternately received pulsating input driving pulses. A silicon rectifier, responsive to an input pulse, causes a saturated transistor to be turned off resulting in a direct current voltage appearing on a collector of the transistor. The voltage is applied across a summing resistor as a direct current step voltage. A second input pulse causes a second silicon controlled rectifier to turn off a second transistor causing a second voltage to appear at the emitter of said second transistor increasing the direct current step voltage. In this manner subsequent stages can cause increases in the direct current step voltage in relation to the quantity of pulses being received. The silicon controlled rectifiers are so interconnected with diodes, Zener diodes and resistors that a subsequent silicon controlled rectifier cannot be fired unless the preceding silicon controlled rectifier has already been fired.

This invention relates to electronic memory systems and particularly to an electronic solid state precision step integrator which produces and stores an output DC voltage that is directly in proportion to the number of input drive pulses.

Heretofore, analog integrators have employed some form of ressitor-capacitor circuitry which relies solely on the storage capability of the capacitor for the memory function. However, due to such critical factors as leakage, temperature, and aging in capacitors, the accuracy of memory and time of information storage have been severely limited in such devices.

The present invention provides for a circuit that can produce an accurate data storage for an infinite length of time and with the processing of this information, at a high degree of accuracy. The use of this circuit described herein has an important feature in its use of minimum number of components to provide many practical applications. One of such applications is its use in the memory section of U.S. application Ser. No. 535,745, filed Mar. 21, 1966, by Molnar and Parfomak and assigned to The Bendix Corporation, the same assignee as the present invention.

Therefore, an object of the present invention is to provide a solid state precision step integrator which produces an output DC voltage that is directly proportional to the number of input drive pulses.

Another object of this invenion is to provide a circuit which uses a minimum number of components that can be adapted for many practical applications such as for holding information for an infinite length of time as applied in the memory storage art.

Another object of the invention is to provide a highly accurate step integrator for use as a simple summation network in the memory section of the overall solid state display system disclosed in the copending U.S. application Ser. No. 535,745.

A further object of this invention is to provide a simple, accurate and long storage memory system by using silicon controlled rectifiers in a summation network, alternately excitable by drive pulses of any shape, frequency, or duration applied through a pair of input line conductors to thereby greatly reduce the need for a complex system.

An additional object of this invention is to provide a memory storage section that can be cleared by a single pulse and which uses silicon controlled rectifiers for high voltage and high speed switching.

These and other objects and features of the invention are pointed out in the following description in terms of the embodiment thereof which is shown in the accompanying drawing. It is to be understood, however, that the drawing is for the purpose of illustration only and is not a definition of the limits of the invention, reference being had to the appended claims for this purpose.

The drawing shows an electronic circuit diagram of a solid state precision step integrator circuit embodying the invention.

Referring to the drawing in detail, the embodiment of this invention primarily provides a memory section M and a summation section S. Connecting the memory section M to an electronic drive circuitry such as that described in the copending U.S. application Ser. No. 400,-534, filed Sept. 30, 1964, by Molnar and Parfomak, now U.S. Patent No. 3,333,114, granted July 25, 1967, and assigned to The Bendix Corporation, the same assignee as the present invention, are input line conductors A and B, a clearing line conductor C and a ground line conductor G.

It should be noted that line conductors A and B alternately receive a train of drive pulses and line conductor C receives clearing pulses from the drive circuitry, mentioned hereinbefore, depending upon the phase relationship of the pulses directed to the drive circuitry by a comparator circuit such as that described in the copending U.S. application Ser. No. 386,996, filed Aug. 3, 1964, by Molnar and Parfomak, now U.S. Patent No. 3,363,112 granted Jan. 9, 1968, and assigned to The Bendix Corporation, the same assignee as the present invention. The phase relationship of the pulses, as described in the U.S. Patent No. 3,333,114 and U.S. Patent No. 3,363,112 herein referred to, depends upon whether a measured parameter is increasing or decreasing. If the measured parameter is increasing, the line conductors A and B will receive driving pulses and if the measured parameter is decreasing, the line conductor C will receive clearing pulses.

Line conductors A and B, connected to the electronic drive circuitry, receive the alternating input drive pulses for turning on a plurality of silicon controlled rectifiers. The silicon controlled rectifiers will then stay on after the drive pulses have disappeared due to their inherent latching effect. This switching action will continue to build up voltages, received from the input signal of the electronic drive circuitry, within the summation section S. That is, the pulses will sequentially turn off a plurality of transistors, as hereinafter described, that will divert a supply of direct current into a summing resistor thus producing a direct current step output for counting the drive pulses received by the system.

This alternate excitation of lines A and B will continue until the increasing measured parameter stops at a datum level, at which time the integrated information is stored indefinitely in the circuit within the silicon controlled rectifiers until a clearing pulse is applied to the clearing line C as hereinafter more fully described.

Therefore, as illustrated in the drawing, the invention provides in the memory section M: a first silicon controlled rectifier 10; a second silicon controlled rectifier 12; a third silicon controlled rectifier 14; a fourth silicon controlled rectifier 16; and so on until an *n*th number of silicon controlled rectifier N. Connecting the ground line conductor G to cathodes 11, 13 15, 17 and so on to a cathode 19 of each silicon controlled rectifier 10, 12, 14, 16, and so on to the silicon controlled rectifier N, respectively, are blocking resistors 20, 21, 22, 23, and so on to blocking resistor 24, respectively.

In addition, connecting the ground line conductor G and parallel to the blocking resistor 20 to 24 are bleeding resistors 26, 27, 28, 29, and so on to bleeding resistor 30.

The input line conductor A is connected by a line conductor 32 to an anode of a diode 34 having a cathode connected to a gating terminal 31 of the first silicon controlled rectifier 10. In addition, there is connected to the gating terminal 31 a line conductor 35 leading to an anode of a diode 36 having a cathode connected by a line conductor 37 to the clearing line conductor C. It should be noted that the diode 34 is operably connected between the input line conductor A and the gating terminal 31 of the silicon controlled rectifier 10 so that it can direct positive going input drive pulses from said line conductor A to the gating terminal 31 of the silicon controlled rectifier 10. In addition, the diode 36 is connected to the clearing line C for permitting clearing pulses to be directed from the gating terminal 31 of the silicon controlled rectifier 10 to the clearing line conductor C upon receiving a negative going clearing signal from said line conductor C from the electronic drive circuitry as provided in the U.S. Patent No. 3,333,114.

The input line conductor B is connected by a line conductor 38 to an anode of a diode 40 having a cathode connected to a gating terminal 33 of the second silicon controlled rectifier 12. The diode 40 is operable in the same manner as diode 34 to direct positive going input drive pulses from the line conductor B to the gating terminal 33 of the silicon controlled rectifier 12. A line conductor 41 leads from the gating terminal 33 to an anode 42 having a cathode connected by a line conductor 43 to the clearing line conductor C. The operation of this part of the circuit is the same as for the circuit used for the silicon controlled rectifier 10 to drive or clear the silicon controlled rectifier 12.

Silicon controlled rectifier 14 is provided with the same electrical circuitry as the prior circuit of the silicon controlled rectifier 10. It comprises a line conductor 44 leading from the input line conductor A to an anode of a diode 46 having a cathode connected to a gating terminal 37 of the silicon controlled rectifier 14. A line conductor 47 leads from the gating terminal 37 to an anode of a diode 48 having a cathode connected by a line conductor 49 to the clearing line conductor C.

Again connecting the input line conductor B to a gating terminal 51 of the silicon controlled rectifier 16 as in the prior circuit of the silicon controlled rectifier 12, is a line conductor 50 leading from the input line conductor B to an anode of a diode 52 having a cathode connected to the gating terminal 51. A line conductor 53 leads from the gating terminal 51 to the anode of a diode 54 having a cathode connected by a line conductor 55 to the clearing line conductor C. This circuit provides for driving and clearing of the silicon controlled rectifier 16.

The circuitry for all the silicon controled rectifiers are substantially the same up to the last silicon controlled rectifier N which may be connected to the input line conductor A through a line conductor 56 leading to an anode of a diode 58 having a cathode connected to a gating terminal 59 of the silicon controlled rectifier N. A line conductor 60 leads from the gating terminals 59 to the anode of a diode 62 having a cathode connected by a line conductor 63 to the clearing line conductor C.

In this manner, all the silicon controlled rectifiers may be either alternately driven by positive going input drive pulses received through line conductors A and B or cleared by negative going clearing pulses received from line conductor C.

As can be seen from the drawing, the summation network S is connected to a direct current supply 111 to receive voltage for its summation operation. In addition, the direct current supply 111 directs current to the silicon controlled rectifiers 10, 12, 14, 16, and N through a line conductor 64 which is connected to the anodes 66, 67, 68, 69, and so on to anode 70 of the silicon controlled rectifiers 10, 12, 14, 16, and so on to silicon controlled rectifier N, respectively, through the resistors 72, 73, 74, 75, and so on to the resistor 76.

Current derived from the line conductor 64 is divided by each silicon controlled rectifier circuitry. In the first silicon controlled rectifier circuit, the current is divided by the resistor 72, the silicon controlled rectifier 10, and a Zener diode 78 having a cathode connected through a line conductor 79 to a point 190 intermediate the resistor 72 and the silicon controlled rectifier 10. Additional current received from the line conductor 64 is divided in the second silicon controlled rectifier circuitry between the resistor 73, the silicon controlled rectifier 12 and a Zener diode 80 having a cathode connected through a line conductor 200 to a point 192 intermediate the resistor 73 and the silicon controlled rectifier 12. Additional current directed through the line conductor 64 is also divided in the third silicon controlled rectifier circuitry between the resistor 74, the silicon controlled rectifier 14 and a Zener diode 81 having a cathode connected through a line conductor 201 to a point 194 intermediate the resistor 74 and the silicon controlled rectifier 14. Again, current received through line conductor 64 is divided in the fourth silicon controlled rectifier circuitry between the resistor 75, the silicon controlled rectifier 16, and to a cathode of a Zener diode (not shown connected to a point 196 intermediate the resistor 75 and the silicon controlled rectifier 16. The current received from the line conductor 64 continues to be divided with its respective silicon controlled rectifier circuitry between the resistor, the silicon controlled rectifier, and the Zener diode the last of which is indicated at 82. The last silicon controlled rectifier provided in the system is indicated by the letter N at which the current received from the line conductor 64 is divided between the last resistor 76, as provided in this circuit, and the last silicon controlled rectifier N. It should be noted though that when the silicon controlled rectifiers are not opened, the current is diverted from the silicon controlled rectifiers, through the Zener diodes in a reverse sense, to the cathode of the succeeding silicon controlled rectifier as herein more fully described.

Interposed between the Zener diode 78 and a line conductor 84 connecting the silicon controlled rectifier 12 and the blocking resistor 21, is a diode 86 having its anode connected to the anode of the Zener diode 78 and its cathode connected to the cathode 13 of the silicon controlled rectifier 12.

Further, interposed between the Zener diode 80 and a line conductor 88, conecting the silicon controlled rectifier 14 and the blocking resistor 22, is a diode 90 having its anode connected to the anode of the Zener diode 80 and its cathode connected to the cathode 15 of the silicon controlled rectifier 14.

Furthermore, interposed between the Zener diode 81 and a line conductor 92, connecting the silicon controlled rectifier 16 and the blocking resistor 23, is a diode 94 having its anode connected to the anode of the Zener diode 81 and its cathode connected to the cathode 17 of the silicon controlled rectifier 16. This type of interconnection continues until the last silicon controlled rectifier N where a diode 98 is interposed between the last Zener diode 82 and a line conductor 96 which connects the silicon controlled rectifier N and the blocking resistor 24. The anode of the diode 98 is connected to the anode of the Zener diode 82 and the cathode of the diode 98 is connected to the cathode 19 of the silicon controlled rectifier N through the line conductor 96.

As illustrated in the drawing, connecting the anodes of both the Zener diode 78 and the diode 86 at an intermediate junction 185 is a line conductor 100 having a resistor 101 connected to a base terminal 102 of a first switching transistor 104. The transistor 104 has its emitter 106 connected to a first diverting line conductor 108 and its collector 110 connected through a resistor 114, to a direct current line conductor 112 which is connected to a positive terminal 113 of a direct current supply 111. The end of the resistor 114 connected to the collector lead 110 of the transistor 104, is further connected to an anode of a diode 116 having a cathode connected to a second diverting line conductor 118.

Further, as illustrated in the drawing, connecting the anodes of both the Zener diode 80 and the diode 90 at an intermediate junction 186 is a line conductor 120 having a resistor 124 connected to a base terminal 122 of a second switching transistor 123. The transistor 123 has its emitter 126 connected to the first diverting line conductor 108 and its collector 127 connected to the direct current line conductor 112 through a resistor 128. The end of the resistor 128 connected to the collector lead 127 of the transistor 123, is connected to an anode of a diode 130 having a cathode connected to the second diverting line conductor 118.

Furthermore, as illustrated in the drawing, connecting the anodes of both the Zener diode 81 and the diode 94 at an intermediate junction 187 is a line conductor 140 having a resistor 142 connected to a base terminal 144 of a third switching transistor 145. The transistor 145 has its emitter 146 connected to the first diverting line conductor 108 and its collector 147 connected to the direct current line conductor 112 through a resistor 148. The end of the resistor 148, connected to the collector lead 147 of the transistor 145, is connected to an anode of a diode 150 having a cathode connected to the second diverting line conductor 118.

Finally, as illustrated in the drawing, connecting the anodes of both the Zener diode 82 and the diode 98 at an intermediate junction 188 is a line conductor 160 having a resistor 162 connected to a base terminal 164 of a last switching transistor 165 used in the system. The transistor 165 has its emitter 166 connected to the first diverting line conductor 108 and its collector 167 connected to the direct current line conductor 112 through a resistor 168. The end of the resistor 168, connected to the collector lead 167 of the transistor 165, is connected to an anode of a diode 170 having a cathode connected to the second diverting line conductor 118.

The first diverting line conductor 108 is connected to a negative terminal 174 of the direct current supply and to the second diverting line conductor 118 through a summing resistor 172, connected in parallel with the summing resistor 172 at an end terminal 177 of the first diverting line conductor 108 and at an end terminal 176 of the second diverting line conductor 118 is a direct current step output E.

In the operation of the system, starting with the silicon controlled rectifiers 10, 12, 14, 16 and up to N in the off state, a direct current voltage from the direct current supply 111 is directed through the line conductor 64 and is divided across each circuitry of line resistors, Zener diodes, and cathode resistors. That is: the current going through the line conductor 64 is directed through the line resistor 72 to be divided between the line resistor 72, the Zener diode 78, and the cathode resistor 21 of the silicon controlled rectifier 12; the current from line conductor 64 going through the line resistor 73 is divided between the line resistor 73, the Zener diode 80, and the cathode resistor 22 of the silicon controlled rectifier 14; and so on until we reach the next to the last line resistor (not shown) or which may correspond to the line resistor 75, where the current going through that resistor will be divided by the line resistor, the Zener diode 82, and the cathode resistor 24 of the last silicon controlled rectifier N.

Due to the presence of direct current voltage at all the junctions 185, 186, 187, and up to 188 when the silicon controller rectifiers 10, 12, 14, 16 and up to silicon controlled rectifier N are in the off state, the transistors 104, 123, 145, and up to 165 are saturated so that they conduct direct current voltage from the positive terminal 113 of the direct current supply 111, received through the direct current line conductor 112, to the negative terminal 174 through the first diverting line conductor 108. Therefore, no current can flow through the summing resistor 172 and to the direct current step output E. The output voltage E is zero.

It should be understood that the presence of the direct current voltage across each cathode resistor 21, 22, 23, and up to cathode resistor 24 except the cathode resistor 20 provides for back biasing voltage for all the silicon controlled rectifiers 12, 14, 16, and up to silicon controlled rectifier N except the silicon controlled rectifier 10. That means that when a positive pulse of a magnitude equal to that of the back biasing voltage is applied from the alternating current switching circuit of the electronic drive circuitry as described in the copending U.S. application Ser. No. 400,534, into input line conductor A, but not B, only silicon controlled rectifier 10 will turn on even though the pulse would appear at all of the gating terminals of the silicon controlled rectifiers whose gating terminal is connected to the line conductor A.

For example, assuming that the first pulse is directed through the line B, silicon controlled rectifier 12 would not be turned on since we have the back biasing or blocking voltage directed from the first line resistor 72 through the Zener diode 78 to the junction 185 past the diode 86 to the cathode 13 of the silicon controlled rectifier 12. The back biasing voltage at the cathode 13 would prevent the firing of the silicon controlled rectifier 12. In addition, the silicon controlled rectifier 10 will not fire since no pulse has as yet been directed through the line conductor A.

A second pulse would be needed, which would be directed through the line conductor A to turn on the silicon controlled rectifier 10 and to direct the current going through the line resistor 72 to be divided only between the line resistor 72 and the cathode resistor 20 of the silicon controlled rectifier 10. When the voltage is diverted into the silicon controlled rectifier 10, the back biasing current at junction 185 will be reduced. This second pulse will turn on the silicon controlled rectifier 10, since it would be applied through the gating terminal 31 of the silicon controlled rectifier 10. That is, since the silicon controlled rectifier 10 is not affected by any back biasing current, it would be fired and it will remain open until cleared as hereinafter described. In adidtion, since the current is directed through the silicon controlled rectifier 10, the back biasing current at junction 185 is reduced. At a particular lowered voltage, the Zener diode 78 would stop conducting in the reverse sense leaving the silicon controlled rectifier 12 in a stand-by state by removing the back biasing voltage from its cathode 13.

When the Zener diode 78 stops conducting, the current at junction 185 will be removed completely. The absence of current at junction 185 will remove the current from the base terminal 102 of the switching transistor 104 to turn off the transistor to divert the current, coming from direct current line conductor 112 through resistor 114, from the first diverting line conductor 108 to the second diverting line conductor 118 past the diode 116 to add a voltage step to the output voltage E.

A third pulse can be then directed through the line conductor B to the gating terminal 33 of the silicon controlled rectifier 12. Since the back biasing current at cathode 13 has been removed, the third pulse coming from the line conductor B to the gating terminal 33 will turn on the second silicon controlled rectifier 12 to permit the conduction of current through the line resistor 73 to be diverted through the silicon controlled rectifier 12 and divided between the line resistor 73 and the cathode resistor 21 of the silicon controlled rectifier 12. Here again, since the current going through the Zener diode 80 would be reduced, the Zener diode would stop conducting in the reverse sense to remove the voltage from junction 186 and thus remove the voltage from the base lead 122 of transistor 123 to divert current from the first diverting line conductor 108 to the second diverting line conductor 118 to add another voltage step to output voltage E.

Further, a fourth pulse can be directed through the line conductor A into the gating terminal 37 of the silicon controlled rectifier 14. Here again, since the second silicon controlled rectifier 12 is conducting and the back biasing voltage on the junction 186 has been removed, the silicon controlled rectifier 14 will be turned on to permit line current from the line resistor 74 to be diverted from the Zener diode 81 into the silicon controlled rectifier 14, removing the current from junction 187 and base lead 144 of the transistor 145 to turn off the transistor 145 to add still another step to the output voltage E. This will continue until the alternating pulse signals received from the device system, as described in the U.S. Patent No. 3,333,114, will stop, designating the datum point of the measured parameter of that system has been reached.

In summary, the first pulse through the line conductor A will turn on the silicon controlled rectifier 10. In addition, the direct current voltage at junction 185 will drop below the Zener diode value 78. The Zener diode will stop conducting in the reverse sense to completely remove the current from the junction 185. At that moment, the transistor 104 would be turned off and the current through the resistor 114 would be diverted into the summing resistor 172, thus producing a step voltage at direct current step output E. As brought out before, the absence of the direct current voltage at junction 185 also removes the back biasing voltage from the second silicon controlled rectifier 12, leaving it in a standby state for the next pulse. The next pulse would be applied through the line conductor B turning on the second silicon controlled rectifier 12 which would turn off the transistor 123 to add another step into the direct current step output E. At this time, the silicon controlled rectifier 14 would be at standby.

This alternate excitation of lines A and B would continue to add voltage step by step to direct current step output E until the appropriate voltage is indicated at the output of the summation network designating the measured parameter stopped increasing.

This integrating information is stored in this circuit until a clearing pulse is applied through the clearing line conductor C to clear the transistors by connecting them to the ground. When a clearing pulse is received at the clearing line conductor C from the drive circuitry system described in the U.S. Patent No. 3,333,114, it would mean that the system senses a decreasing measured parameter. This clearing pulse would be applied to a clearing transistor as provided in the above-mentioned application to short the clearing line conductor C to the negative terminal and thus stop the silicon controlled rectifier from conducting thereby permitting the build up of voltage at the junctions 185, 186 and up to the junction 188, to cause the switching transistors 104, 123, and up to transistor 165 to conduct to divert the voltage from the diverting line conductor 118 to be directed to the negative terminal 174 by the diverting line conductor 108 to clear the system.

As described herein, we have provided a memory system having a summation section controlled by a memory section which would retain information for an infinite length of time. In this respect, high accuracy is achieved in a memory system by utilizing silicon controlled rectifiers and a simple summation network. In addition, the alternate excitation of the two input line conductors A and B greatly reduces the complexity of the system and as shown the entire memory can be cleared when desired by a single pulse through the clearing line conductor C.

In addition, since the silicon controlled rectifier circuit can be used for a high voltage switching function, and since the silicon controlled rectifier switches can be switched on at a fast rate, the integration is performed at a very speed. It should be noted also that the pulses required by the alternate excitation of the line conductors A and B may be of any shape, frequency, or duration without altering the efficiency of the step integrator.

Although only one embodiment of the invention has been illustrated and described, various changes in the form and relative arrangements of the parts, which will now appear to those skilled in the art may be made without departing from the scope of the invention. Reference is, therefore, to be had to the appended claims for a definition of the limits of the invention.

What is claimed is:

1. An electronic solid state step integrator for providing an output direct current voltage that is directly proportional to the number of pulsating input drive pulses to the extent of the magnitude of a measured parameter comprising, a pair of input line conductors for alternately receiving the pulsating input driving pulses, a first switch means alternately responsive to said input drive pulses for sequentially conducting voltage therethrough upon each excitation of said input drive pulse, a second switch means operably driven by the sequentially conducting voltage of said first switch means for adding said voltages from the first switch means upon each excitation of the input drive pulses and thereby producing an output voltage that is directly proportional to the number of pulsating input drive pulses.

2. An electronic solid state step integrator for receiving a pulsating input drive signal to the extent of the magnitude of a measured parameter comprising, a pair of input line conductors alternately receiving the input drive signal, a direct current supply voltage, switch means responsive to said input drive signal for conducting voltage from said direct current supply voltage upon each excitation of said input signal, said switch means including a first plurality of silicon controlled rectifiers connected to one of said line conductors and operable for alternately receiving the input drive signal from said one conductor line, a second plurality of silicon controlled rectifiers connected to the other of said line conductors and operable for alternately receiving the other of said input drive signal from said other conductor line, and means interconnecting said first plurality of silicon controlled rectifiers to said second plurality of silicon controlled rectifiers for sequentially turning on said silicon controlled rectifiers until a datum measurement of said measured parameter is reached.

3. A solid state step integrator for controlling solid state displays comprising a pair of input line conductors for alternately receiving input drive pulses corresponding to an increasing given measured parameter, memory switch means responsive to said input drive pulses, a summation switch means having a summation resistor for receiving said input drive pulses through said memory switch means and transmitting said input drive pulses to its summation resistor for adding said alternating input drive pulses proportionally to the magnitude of the measured parameter.

4. A solid state step integrator for producing and storing a direct current output voltage that is directly proportional to the number of input drive pulses of a magnitude corresponding to the extent of a measured quantity comprising, a pair of line conductors, each conductor alternately receiving the input drive pulses thereby presenting two series of pulses, one series of pulses directed through one of said line conductors and the other series of pulses directed through the other of said line conductors, a first plurality of silicon controlled rectifiers having gating terminals operatively connected to said one of said line conductors for receiving therefrom the one series of drive pulses, a second plurality of silicon controlled rectifiers having gating terminals operatively connected to said other of said line conductors for receiving therefrom the other series of said input drive pulses, a direct current source having a positive terminal connected to the anodes of each silicon controlled rectifier of said two pluralities of silicon controlled rectifiers, a Zener diode interposed between two adjacent silicon controlled rectifiers, each Zener diode having a cathode connected to an anode of a preceding silicon controlled rectifier, and an anode connected to the cathode of the succeeding silicon controlled rectifier, a plurality of transistors having base leads connected to the anodes of said Zener diodes for receiving current from said direct current source through said Zener diodes upon said Zener diodes becoming conductive in a reverse sense, said transistors having collector leads connected to the positive terminal of said direct current source and emitter leads connected to the negative terminal of said direct current source, a summation resistor, means connecting said summation resistor in bridging relation with said transistors from collectors to emitters, whereby the current from said direct current source through said Zener diodes may effectively saturate said transistors permitting conduction therethrough for directing the current to the negative terminal of said direct current source and upon a pulse received from one of said line conductors being applied to the gating terminal of said preceding silicon controlled rectifier to render it conductive and thereby diverting voltage from one of said Zener diodes into said preceding silicon controlled rectifier to remove the current from the base lead of said transistors connected to the anodes of said Zener diodes thereby closing off said transistors to permit the current from said direct current source to be diverted from the negative terminal of said direct current source to be directed through said summation resistor for its summation operation.

5. A solid state step integrator for controlling solid state displays comprising, a pair of input line conductors for alternately receiving input drive pulses depending on an increasing given measured quantity, a first plurality of silicon controlled rectifiers having gating terminals connected to one of said input line conductors for alternately receiving therefrom the input drive pulses, said pulses operable for turning on said silicon controlled rectifiers, a second plurality of silicon controlled rectifiers having gating terminals connected to the other of said input line conductors for alternately receiving the other of said input drive pulses, said other pulses operable for turning on said second plurality of silicon controlled rectifiers, a direct current supply having a positive terminal connected to the anodes of each silicon controlled rectifier of said two pluralities of silicon controlled rectifiers, a blocking resistor connecting the cathodes of each of said silicon controlled rectifiers to the negative terminal of said direct current supply, a plurality of Zener diodes, each of said Zener diodes interposed between a preceding silicon controlled rectifier and a succeeding silicon controlled rectifier having a cathode connected to the anode of said preceding silicon controlled rectifier, a diode having an anode connected to an anode of each of said Zener diodes and a cathode connected to the cathode of said succeeding silicon controlled rectifiers, at an intermediate point between said blocking resistor and the cathode of said succeeding silicon controlled rectifier for applying a back biasing voltage to the cathode of said succeeding silicon controlled rectifiers from said direct current supply when said preceding silicon controlled rectifier is not conducting, a plurality of transistors, each of said transistors having a base lead connected to the anode of said Zener diode and said diode for rendering each of said transistors conductive upon receiving voltage from said direct current supply through said Zener diode when said preceding silicon controlled rectifier connected to the said Zener diode is not conducting, said transistors having collector leads connected to the positive terminal of said direct current supply and emitter leads connected to the negative terminals of said direct current supply for dissipation of voltage to said negative terminal when said transistor is conductive, a summation resistor, diode means connecting the summation resistor between the collector leads and the emitter leads of said transistors to render the summation resistor operable for receiving voltage in steps diverted from said transistors for the summation operation upon pulses sequentially turning on said silicon controlled rectifiers diverting a voltage through said silicon controlled rectifiers from said Zener diodes to said silicon controlled rectifiers thereby removing the voltage from the base leads of said transistors to render them nonconductive.

6. The structure of claim 5 further comprising, a clearing line conductor, a plurality of diodes, each diode having a cathode connected to said clearing line conductor and an anode connected to the gating terminal of each of said silicon controlled rectifiers, said clearing line conductor operable for receiving an excitation pulse voltage and directing said voltage through each of said diodes into the gating terminal of each silicon controlled rectifier resulting in clearing said silicon controlled rectifiers upon receiving said pulse for rendering them nonconductive.

7. The structure of claim 5 further comprising, a clearing line conductor, a first plurality of diodes, each diode having a cathode connected to said clearing line conductor and an anode connected to the gating terminal of each of said silicon controlled rectifiers, a first diverting line conductor connecting the emitter leads of said transistors to the negative terminal of said direct current supply and to one terminal of said summation resistor, a second diverting line conductor, a second plurality of diodes having anodes connected to the collector leads of said transistors and cathodes connected to said second diverting line conductor, said second diverting line conductor connecting the collector leads of said transistors to the other terminal of said summation resistor, and operable for receiving voltages due to the input drive pulses and directing said voltages to said summation resistor for the summation operation when said transistors are nonconductive, and said clearing line conductor operable for receiving a clearing pulse for removing the voltage on the gating terminal of said silicon controlled rectifiers, to permit the shutting off of said silicon controlled rectifiers, and diverting voltage received from the direct current supply from said Zener diodes to the base leads of said transistors, said first diverting line conductor operable for receiving voltages from said transistors due to the clearing pulse and directing said voltage to the negative terminal of said direct current supply for the clearing operation when said transistors are conductive.

8. A solid state step integrator for controlling solid state displays comprising, a pair of input line conductors for alternately receiving input excitation drive pulses depending on an increasing given measured quantity, a first silicon controlled rectifier, a second silicon controlled rectifier, a Zener diode having its cathode lead connecting the anode lead of said first silicon controlled rectifier and its anode connecting the cathode of said second silicon controlled rectifier, a direct current supply terminal resistor connecting the negative of the direct current supply to the cathode of the silicon controlled rectifier, said direct current supply having a positive terminal connected to the anodes of said first and second silicon controlled rectifiers and the cathode of said Zener diode for directing a current through said Zener diode upon said first silicon controlled rectifier being rendered nonconductive and thereby applying a back biasing voltage on the cathode of said second silicon controlled rectifier operable for preventing flow of current through said second silicon controlled rectifier until the conduction of current through the first silicon controlled rectifier, said first silicon controlled rectifier having a gating terminal, and a diode having a cathode connecting the gating terminal of said first silicon controlled rectifier to one of the input line conductors for rendering said first silicon controlled rectifier conductive upon receiving a single pulse from said one input line conductor.

9. The structure of claim 8 further comprising a third silicon controlled rectifier, another Zener diode connecting the anode of said second silicon controlled rectifier and the cathode of said third silicon controlled rectifier, another diode, said second silicon controlled rectifier having a gating terminal, said other diode connecting the gating terminal of said second silicon controlled rectifier to the other of said line conductors, the voltage from the direct current supply applied to the anode of said second silicon controlled rectifier being diverted to said second Zener diode when said second silicon controlled rectifier is not conducting for applying a back biasing voltage to the cathode of said third silicon controlled rectifier and operable for preventing current conduction through said third silicon controlled rectifier until the current conduction of the second silicon controlled rectifier, said first silicon controlled rectifier becoming conductive upon the gating terminal thereto receiving the single excitation pulse from said one conductor through said one diode for removing the voltage from said first Zener diode and thereby removing the back biasing voltage from the cathode of said second silicon controlled rectifier, and upon a second excitation pulse being applied through the other of the line conductors to the gating terminal of said second silicon controlled rectifier, said second silicon controlled rectifier is rendered conductive and thereby effective to remove the back biasing voltage from the cathode of said third silicon controlled rectifier for rendering said third silicon controlled rectifier in a standby condition for a third pulse to be received from said one line conductor.

10. The structure of claim 9 further comprising a transistor having a base lead, means connecting the anode of said first Zener diode to the base lead for applying a voltage from said diode to the base of said transistor to render said transistor conductive when said first silicon controlled rectifier does not conduct, and a summation resistor operable to receive a step voltage upon said first excitation pulse through said one line conductor being effective to remove the voltage from said first Zener diode and thereby remove the voltage from the base of said transistor to render said transistor nonconducting.

11. The structure of claim 8 further comprising a third silicon controlled rectifier, a third diode having its anodes connecting the first of said two line conductors and its cathode connecting the gating terminal of said third silicon controlled rectifier, a second Zener diode interposed between said second and said third silicon controlled rectifier having a cathode connected to the anode of said second silicon controlled rectifier and an anode connected to the cathode of said third silicon controlled rectifier and operable to receive voltage from said direct current source to produce a back biasing effect on the cathode of said third silicon controlled rectifier, a second transistor having a base lead connected to the anode of said second Zener diode, said second Zener diode permitting current to be directed to said second transistor and thereby keeping the transistor in a conductive state when said second silicon controlled rectifier is in an off state, the second silicon controlled rectifier having a gating terminal, and when an additional pulse directed through the other line conductor to be applied to the gating terminal of the second silicon controlled rectifier so as to render the second silicon controlled rectifier conductive so as to permit current to be diverted from said second Zener diode through said second silicon controlled rectifier, the additional pulse transfers said second transistor from said conductive state to a nonconductive state and thereby permits a diversion of the direct current supply to add an additional step to the summation resistor.

References Cited

UNITED STATES PATENTS

| | | | |
|---|---|---|---|
| 2,970,306 | 1/1961 | Zieman et al. | 340—347.1 |
| 2,993,202 | 7/1961 | Halonen | 340—347.1 |
| 3,051,938 | 8/1962 | Levy | 340—347 |
| 3,307,173 | 2/1967 | Popodi et al. | 340—347 |

MAYNARD R. WILBUR, *Primary Examiner.*

JEREMIAH GLASSMAN, *Assistant Examiner.*

U.S. Cl. X.R.

328—186